United States Patent
Reshidko et al.

(10) Patent No.: US 11,669,159 B2
(45) Date of Patent: Jun. 6, 2023

(54) EYE TRACKER ILLUMINATION THROUGH A WAVEGUIDE

(71) Applicant: Microsoft Technology Licensing, LLC, Redmond, WA (US)

(72) Inventors: Dmitry Reshidko, Sammamish, WA (US); Congshan Wan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 17/208,880

(22) Filed: Mar. 22, 2021

(65) Prior Publication Data

US 2022/0300073 A1    Sep. 22, 2022

(51) Int. Cl.
| | | |
|---|---|---|
| *G06F 3/01* | (2006.01) | |
| *G06V 40/18* | (2022.01) | |
| *G06V 10/60* | (2022.01) | |
| *G06V 40/19* | (2022.01) | |
| *G02B 27/00* | (2006.01) | |
| *G02B 27/01* | (2006.01) | |
| *G06T 19/00* | (2011.01) | |

(52) U.S. Cl.
CPC ......... *G06F 3/013* (2013.01); *G02B 27/0093* (2013.01); *G02B 27/0172* (2013.01); *G06T 19/006* (2013.01); *G06V 10/60* (2022.01); *G06V 40/19* (2022.01); *G06V 40/197* (2022.01); *G02B 2027/0174* (2013.01)

(58) Field of Classification Search
None
See application file for complete search history.

(56) References Cited

U.S. PATENT DOCUMENTS

| | | | |
|---|---|---|---|
| 2018/0046859 A1* | 2/2018 | Jarven | H04N 5/332 |
| 2020/0183171 A1 | 6/2020 | Robaina et al. | |
| 2020/0366887 A1 | 11/2020 | Schowengerdt et al. | |
| 2021/0111319 A1* | 4/2021 | Lutgen | G02B 27/0172 |
| 2022/0011496 A1* | 1/2022 | Bhakta | G02B 3/0087 |

OTHER PUBLICATIONS

"International Search Report and Written Opinion Issued in PCT Application No. PCT/US22/018591", dated Jul. 20, 2022, 17 Pages.
Invitation to Pay additional fees Issued in PCT Application No. PCT/US22/018591, dated May 24, 2022, 12 Pages.

* cited by examiner

*Primary Examiner* — Jwalant Amin
(74) *Attorney, Agent, or Firm* — Mark K. Young; Mayer & Williams, PC

(57) ABSTRACT

In a see-through waveguide-based HMD device configured to display holographic virtual images within a field of view (FOV) of the device user, a single pixel or group of pixels are lit to supply illumination at known locations on the display that is reflected from the user's eyes and captured by one or more sensors in an eye tracker. The eye tracker may apply real-time image analysis to the captured reflected light, called "glints," to extract features of the user's eyes to determine where the HMD device user is looking—the gaze point—and calculate eye movement, location, and orientation. A negative lens functionality utilized in the HMD device to provide a fixed focal depth for the virtual images enables the lit pixels to function as virtual glint sources for the eye tracker sensor that are located at the fixed focal depth and from multiple illumination positions within the user's FOV.

20 Claims, 15 Drawing Sheets

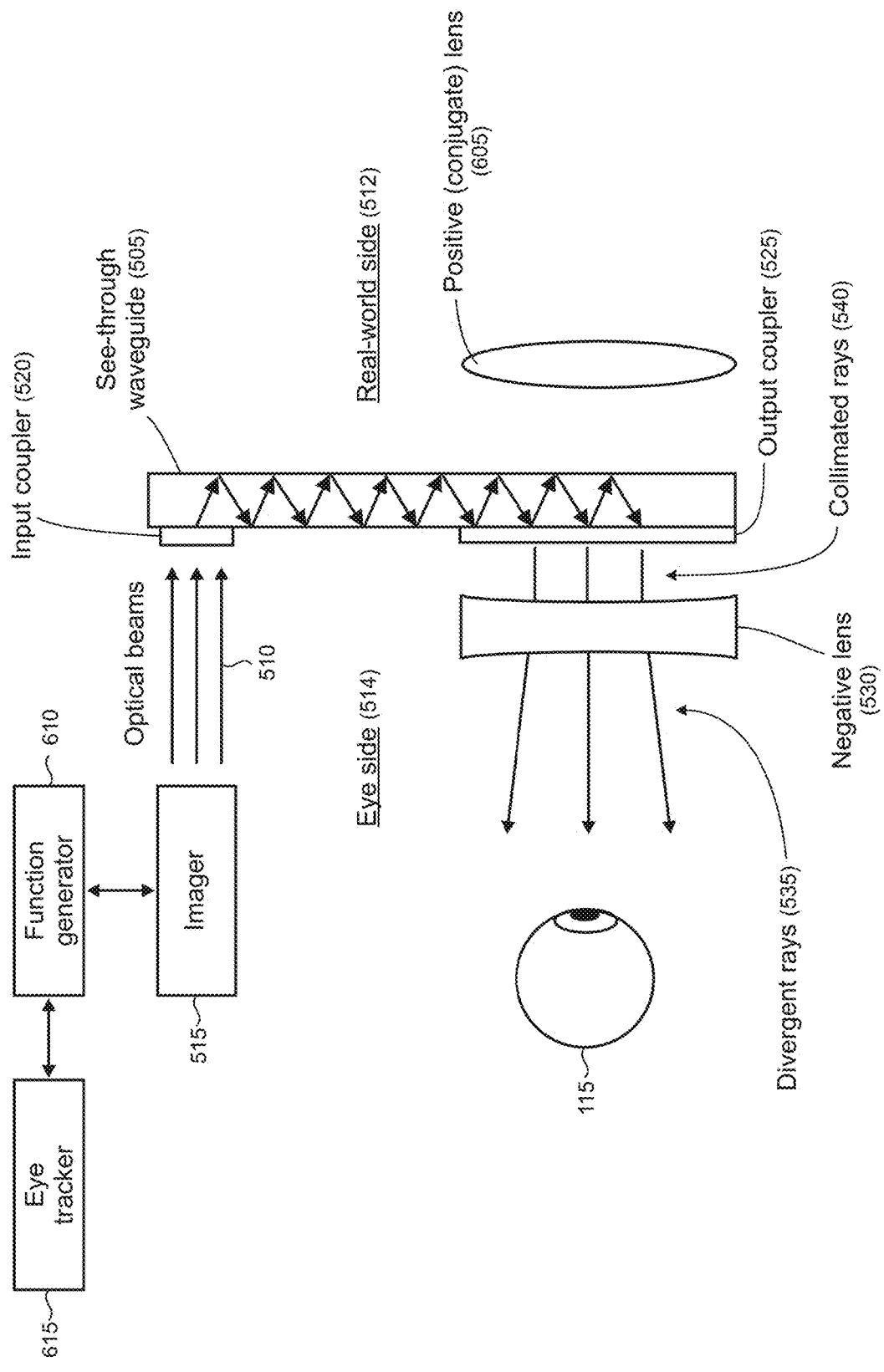

☆ = virtual glint sources located at local points of peak intensity

EYE TRACKER ILLUMINATION THROUGH A WAVEGUIDE

BACKGROUND

In a wearable device such as a head-mounted display (HMD) device, tracking the positions of the eyes of a user can enable estimation of the direction of the user's gaze. Gaze direction can be used as an input to various programs and applications that control the display of images on the HMD devices, among other functions. To determine the position and gaze of the user's eyes, an eye tracker may be incorporated into the HMD device.

SUMMARY

In a see-through waveguide-based HMD device configured to display holographic virtual images within a field of view (FOV) of the device user, a single pixel or group of pixels is lit to supply illumination at a known location on a display device that is reflected from the user's eyes and captured by one or more sensors in an eye tracker. The eye tracker may apply real-time image analysis to the captured reflected light, called "glints," to extract features of the user's eyes to determine where the HMD device user is looking—the gaze point—and calculate eye movement, location, and orientation. A negative lens functionality utilized in the HMD device to provide a fixed focal depth for the virtual images enables the lit pixels to function as virtual glint sources for the eye tracker sensor that are located at the fixed focal depth and from multiple illumination positions within the user's FOV. Thus, points of illumination for the eye tracker can be virtually located directly in front of the user's eyes without obstructing the user's line of sight through the see-through display of the HMD device.

In various illustrative embodiments, a function generator in the HMD device may be configured for lighting a single pixel or multiple pixels in one of the color components in a color model, such as RGB (red, green, blue), that is utilized by an imager that projects virtual images on the display device. Combinations of RGB colors or white light may also be utilized. Pixels can be lit for eye tracker illumination using a single rendered frame on the display device, across multiple frames, or using a combination of non-sequential frames.

Unlike conventional fixed illumination sources, the function generator can provide granular control of individual pixels at any point in the FOV thus providing for a flexible and adaptable illumination source geometry. Illumination patterns for pixels may be dynamically varied to facilitate tuning, adjustment, or calibration of the eye tracker on a per-device or per-user basis. For example, the function generator can light pixels at points of peak intensity on the display device to optimize eye tracker efficiency and fidelity. Lit pixels may also be variably located to accommodate individual user's physiological characteristics, usage of corrective lenses, etc.

The function generator may be configured to light sufficient pixels in the display device to provide general illumination of features of the user's eyes including the iris. The eye tracker sensor, or a separate inward-facing camera or sensor in the HMD device, may be adapted to capture details of the illuminated iris for biometric identification or authentication. Iris scanning captures a biometric signature that may provide a more secure alternative to passwords for the user to access or be authenticated by the HMD device or an associated device.

In addition to utilizing the visible RGB sources, the display device may be configured with an infrared (IR) source such as a laser or LED (light emitting diode). The function generator can activate IR pixels in the FOV of the display device to act as non-visible virtual glint sources. The eye tracker sensor is adapted in such cases for sensitivity to glints in the IR range of wavelengths. In an alternative embodiment, iris scanning can be performed using IR light to provide non-visible illumination of the user's eyes.

Implementing virtual illumination sources through the waveguide of the display of the HMD device provides significant technical advantages. Eye tracking may be more performant and efficient by placing virtual glint sources in the FOV of the display directly in front of the eyes. In particular, the angular orientation of the glint sources relative to the sensor may be advantageously optimized for utilization and analyses by the eye tracker algorithms, for example, to provide shorter algorithmic integration intervals or more accurate tracking.

Conventional illumination sources are typically located around the periphery of the display in fixed positions due to device packaging, ergonomic, and industrial design considerations. The virtual glint sources, by contrast, can be readily integrated into both existing and new HMD device designs while enabling variable and dynamic positioning of eye tracker illumination. As the virtual glint sources share the same waveguide structures as the display system in the HMD device, eye tracking can be implemented using a compact form factor. Eliminating the use of conventional illumination sources and its peripheral wiring and componentry reduces complexity and parts count to thereby improve reliability of the eye tracker and lower costs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 6 illustratively shows a display device in an operative relationship with a function generator and further shows a conjugate lens pair;

Like reference numerals indicate like elements in the drawings. Elements are not drawn to scale unless otherwise indicated.

DETAILED DESCRIPTION

Developing eye-tracking systems for HMD (head-mounted display) devices may present a number of technical and practical problems. Eye-tracking systems can add weight, involve large optical components, and require extra processing power. For certain eye tracking algorithms, it may be beneficial as far as accuracy, robustness, and/or speed for the eye tracking illumination source to be directly in front of the eye. Direct illumination, however, would block the user's line of sight. This is typically undesirable, in particular, in the case of a see-through display. One way to overcome this line-of-sight obstruction is to use one or more partially reflective (spectrally selective or spectrally neutral) mirrors to redirect the illumination to the eye. This approach, however, relies on potentially large optical components.

The inventors have recognized that conventional eye-tracking systems may add extraneous bulk, weight, and design complications to the devices for which they are engineered. Optical complications may arise for the user and installing eye-tracking in display devices such as head-mounted display (HMD) devices may add bulk and weight to the device, particularly where reflective mirrors are utilized to get around line-of-sight obstructions. Optimizing a user's viewing experience while also providing an efficient and effective design for eye-tracking is a target for engineers that often involves trade-offs. In response to these issues, the present systems and methods described herein have been developed to provide an evolved design for use in HMD devices and other applications that utilize eye-tracking.

Figure 1:
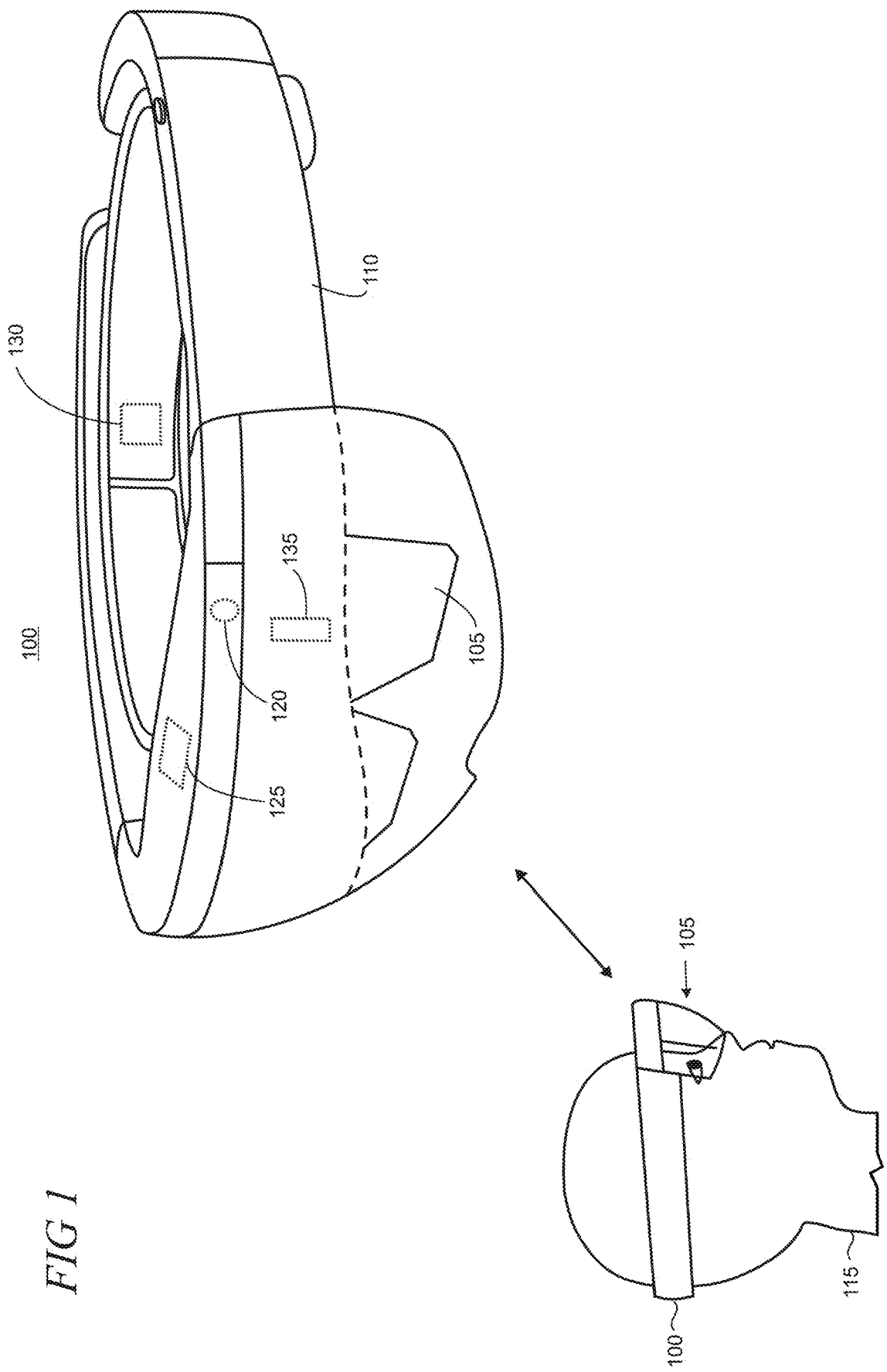
FIG. 1 shows a pictorial partially cutaway view of an illustrative HMD device that is configured with the present eye tracker illumination through a waveguide.

Turning now to the drawings, FIG. 1 shows a pictorial partially cutaway view of an illustrative HMD device 100 that is configured with the present eye tracker having illumination through a waveguide. In this example, the HMD device includes a display device 105 and a frame 110 that wraps around the head of a user 115 to position the display device near the user's eyes to provide a virtual-reality or mixed-reality experience to the user.

Any suitable technology and configuration may be used to display images using the display device. For example, for a virtual-reality experience, the display device may be an opaque light-emitting diode (LED) display, a liquid crystal display (LCD), a microelectromechanical system (MEMS) scanner, or any other suitable type of opaque display device. In some implementations, outward facing cameras 120 may be provided that capture images of the surrounding physical environment, and these captured images may be rendered on the display device 105 along with computer-generated virtual images that augment the captured images of the physical environment.

For a mixed-reality experience, the display device 105 may be see-through so that the user of the HMD device 100 can view physical, real-world objects in the physical environment over which pixels for virtual objects are overlayed. For example, the display device may include one or more partially transparent waveguides used in conjunction with a virtual image-producing imager such as, for example, a microdisplay comprising RGB (red, green, blue) LEDs, an organic LED (OLED) array, liquid crystal on silicon (LCoS) device, and/or MEMS device, or any other suitable displays or microdisplays operating in transmission, reflection, or emission. The imager may also include electronics such as processors, optical components such as mirrors and/or lenses, and/or mechanical and other components that enable a virtual display to be composed and provide one or more input optical beams to the display system. Imagers may be referred to as light engines in some contexts.

The frame 110 may further support additional components of the HMD device 100, including a processor 125, an inertial measurement unit (IMU) 130, and an eye tracker 135. The processor may include logic and associated computer memory configured to receive sensory signals from the IMU and other sensors, to provide display signals to the display device 105, to derive information from collected data, and to enact various control processes described herein.

The display device 105 may be arranged in some implementations as a near-eye display. In a near-eye display the imager does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic virtual image light after leaving the display system. The exit pupil defines the eyebox which comprises a spatial range of eye positions of the user in which the holographic virtual images projected by the display device are visible.

Figure 2:
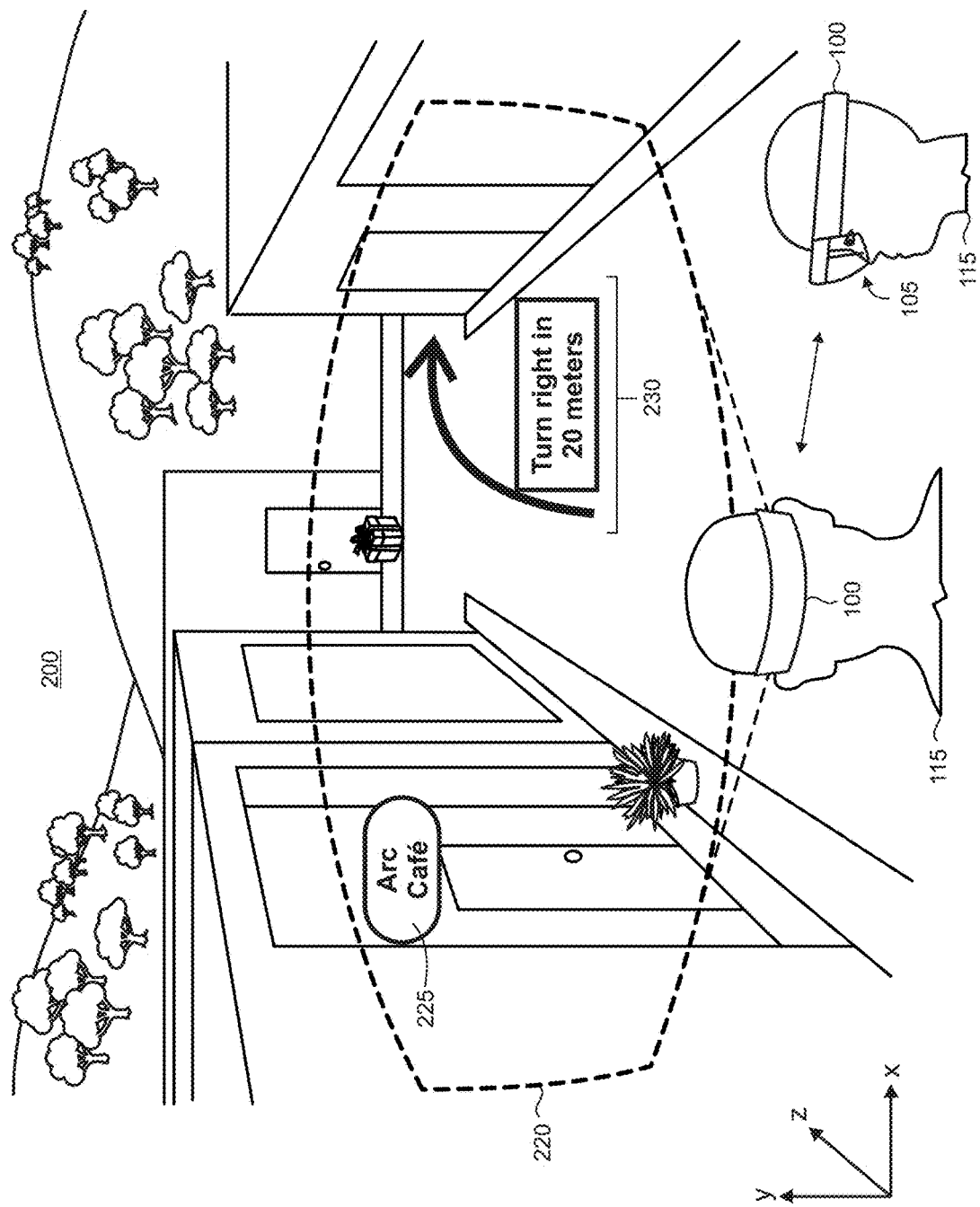
FIG. 2 illustratively shows holographic virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display device 105 is configured as a near-eye display system having at least a partially transparent, see-through waveguide, among various other components, and may be further adapted to provide virtual glint sources in accordance with the principles discussed herein. As noted above, an imager (not shown) generates holographic virtual images that are guided by the waveguide in the display device to the user. Being see-through, the waveguide in the display device enables the user to perceive light from the real world.

The see-through waveguide-based display device 105 can render holographic images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the holographic images in the virtual world are not necessarily identical, as the virtual FOV provided by the display device is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

In illustrative example shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the holographic virtual images include a tag 225 that identifies a restaurant business and directions 230 to a place of interest in the city. The mixed-reality environment 200 seen visually on the waveguide-based display device may also be supplemented by audio and/or tactile/haptic sensations produced by the HMD device in some implementations.

During natural viewing, the human visual system relies on multiple sources of information, or "cues," to interpret three-dimensional shapes and the relative positions of objects. Some cues rely only on a single eye (monocular cues), including linear perspective, familiar size, occlusion, depth-of-field blur, and accommodation. Other cues rely on both eyes (binocular cues), and include vergence (essentially the relative rotations of the eyes required to look at an object) and binocular disparity (the pattern of differences between the projections of the scene on the back of the two eyes).

To view objects clearly, humans must accommodate, or adjust their eyes' focus, to the distance of the object. At the same time, the rotation of both eyes must converge to the object's distance to avoid seeing double images. In natural viewing, vergence and accommodation are linked. When viewing something near (e.g., a housefly close to the nose) the eyes cross and accommodate to a near point. Conversely, when viewing something at optical infinity, the eyes' lines of sight become parallel, and the eyes' lenses accommodate to infinity.

In typical HMD devices, users will always accommodate to the focal distance of the display (to get a sharp image) but converge to the distance of the object of interest (to get a single image). When users accommodate and converge to different distances, the natural link between the two cues must be broken and this can lead to visual discomfort or fatigue. Accordingly, to maximize the quality of the user experience and comfort with the HMD device 100, virtual images may be rendered in a plane to appear at a constant distance from the user's eyes. For example, virtual images, including the images 225 and 230, can be set at a fixed depth (e.g., 1 m) from the user 115. Thus, the user will always accommodate near 1 m to maintain a clear image in the HMD device. It may be appreciated that 1 m is an illustrative distance and is intended to be non-limiting. Other fixed depth distances may be utilized to meet requirements of specific applications of virtual- and mixed-reality HMD devices.

Figure 3A:
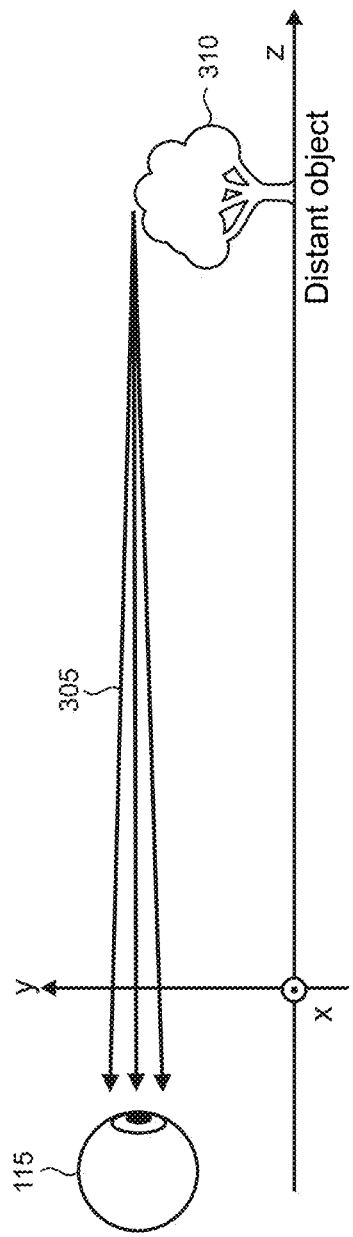
FIGS. 3A, 3B, and 3C show illustrative paths of light rays that are respectively associated with a distant object, an object at infinity, and a nearby object.
Figure 3B:
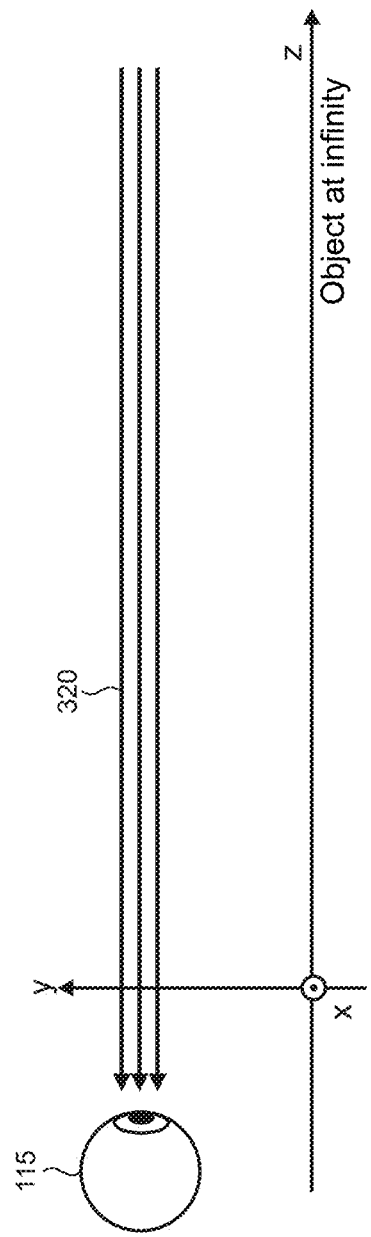
Figure 3C:
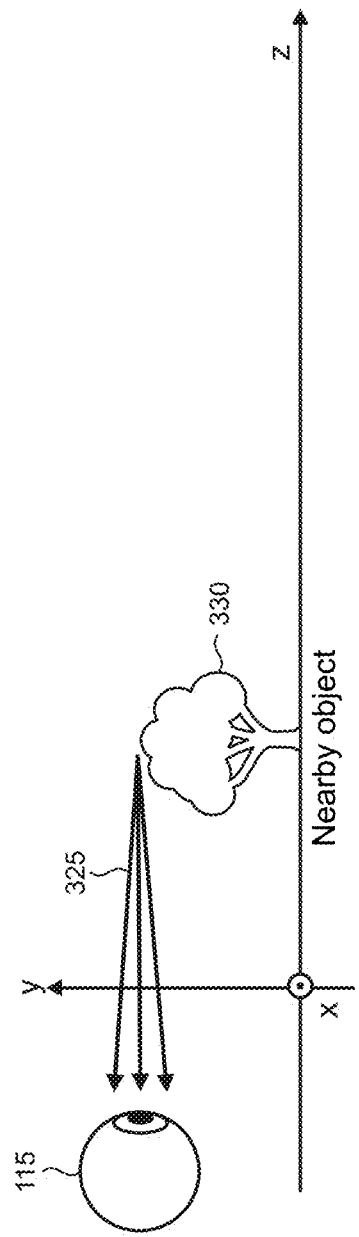

In the real world as shown in FIG. 3A, light rays 305 from distant objects 310 reaching an eye of a user 115 are almost parallel. Real-world objects at optical infinity (roughly around 6 m and farther for normal vision) have light rays 320 that are exactly parallel when reaching the eye, as shown in FIG. 3B. Light rays 325 from a nearby real-world object 330 reach the eye with different, more divergent angles, as shown in FIG. 3C, compared to those for more distant objects.

Figure 4:
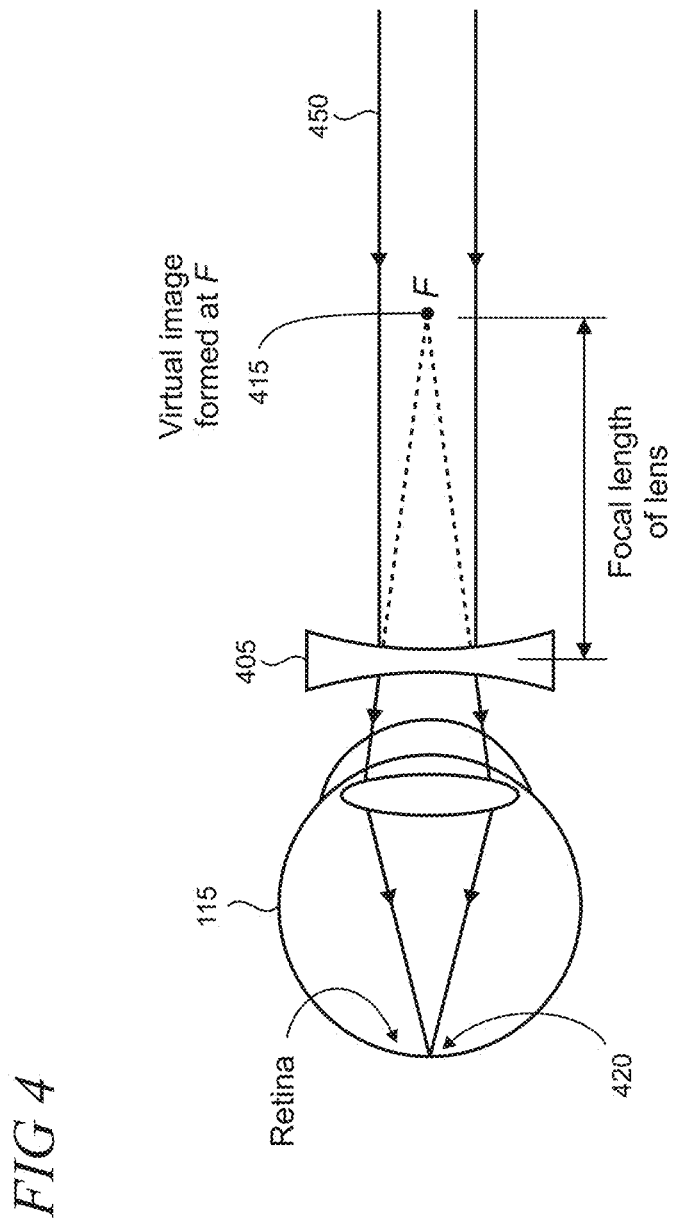
FIG. 4 shows an illustrative negative lens that provides for a virtual image that is located at a focal point of the lens.

Various approaches may be utilized to render virtual images with the suitable divergent angles to thereby appear at the targeted depth of focus. For example, FIG. 4 shows that a negative (i.e., concave) lens 405 can diverge the collimated/parallel rays 450 that are received from a conventional output coupler element (not shown) in an HMD device to produce a holographic virtual image having a location that is apparent to the user at a focal point, F (as indicated by reference numeral 415), that is determined by the focal length of the lens (e.g., 0.5 m, 1 m, 2 m, etc.). The rays from the negative lens arriving at the user's eye 115 are non-parallel and divergent, as shown, and converge using the eye's internal lens to form the image on the retina, as indicated by reference numeral 420.

The present invention leverages a negative lens utilized for virtual object focus to enable pixels used for virtual images to be repurposed as virtual glint sources for eye tracking. Advantageously, the virtual glint sources can be located within the FOV of the HMD device in front of the user's eyes but without occluding the user's view of the real world through the display device.

Figure 5:
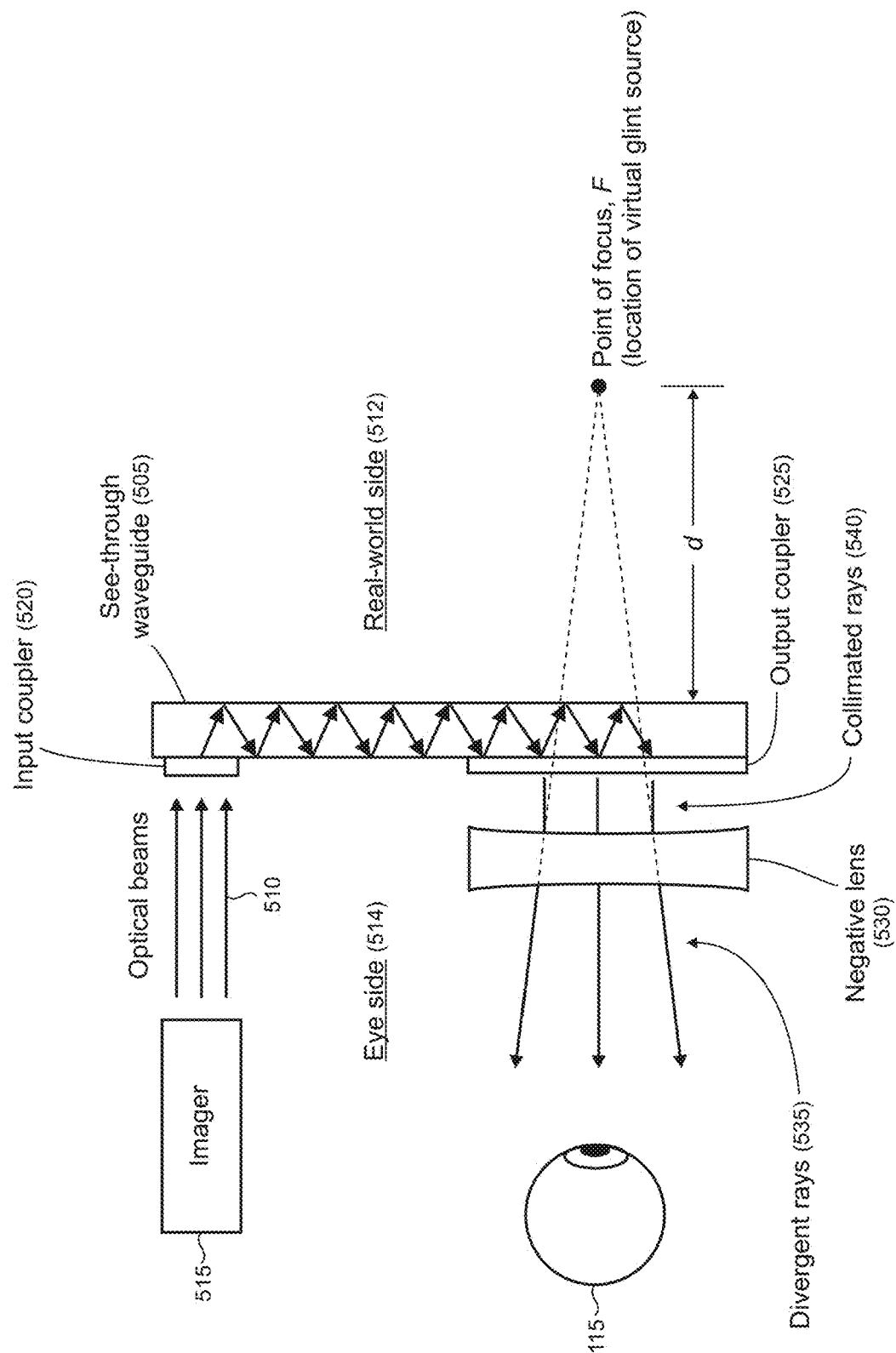
FIG. 5 illustratively shows a simplified side view of an illustrative display device that includes a waveguide-based optical combiner that may be used in an HMD device.
Figure 15:
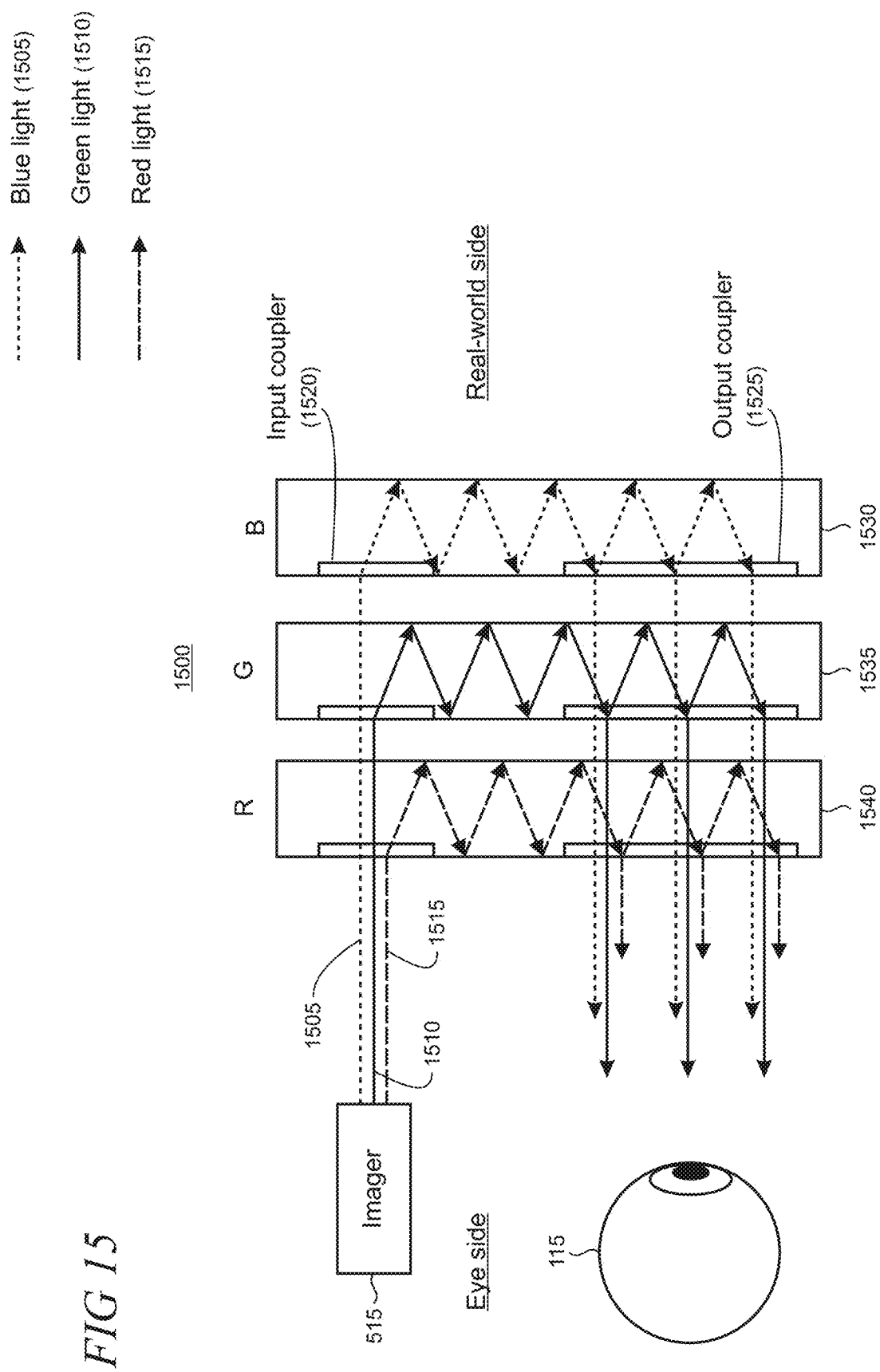
FIG. 15 shows a side view of an illustrative assembly of three waveguides with integrated coupling elements that are stacked to form an optical combiner, in which each waveguide handles a different color in an RGB (red, green, blue) color model.

FIG. 5 shows a simplified side view of the display device 105 that may be used in the HMD device 100 (FIG. 1). The display device is adapted in this example to provide illumination that may be used by an eye tracker (not shown). The display device includes at least one partially transparent (i.e., see-through) waveguide 505 that is configured to propagate visible light. While a single waveguide is shown in FIG. 5 for sake of clarity in exposition of the present principles, it will be appreciated that a plurality of waveguides may be utilized in some applications, as shown in FIG. 15 and described in the accompanying text below.

The waveguide 505 facilitates light transmission between the imager and the eye. One or more waveguides can be utilized in the near-eye display system because they are transparent and because they are generally small and lightweight. This is desirable in applications such as HMD devices where size and weight are generally sought to be minimized for reasons of performance and user comfort. For example, the waveguide 130 can enable the imager to be located out of the way, for example, on the side of the user's head or near the forehead, leaving only a relatively small, light, and transparent waveguide optical element in front of the eyes.

In an illustrative implementation, the waveguide 505 operates using a principle of total internal reflection (TIR) so that light can be coupled among the various optical elements in the HMD device 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta c$) is the angle of incidence above which TIR occurs, which is given by Snell's Law, as is known in the art. More specifically, Snell's law states that the critical angle ($\theta_C$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

The user 115 can look through the waveguide 505 to see real-world objects on the real-world side of the display device 105 (the real-world side is indicated by reference numeral 512 in FIG. 5). For the virtual part of the FOV of the display device, optical beams 510 associated with virtual images are provided by an imager 515. The optical beams are in-coupled to the waveguide by an input coupler 520 and propagate through the waveguide in total internal reflection. The image light is out-coupled from the waveguide by an output coupler 525. The combination of see-through waveguide and coupling elements may be referred to as a mixed-reality optical combiner because it functions to combine real-world and virtual-world images into a single display.

Typically, in such waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. As discussed in more detail below, the collimated inputs and outputs in conventional waveguide-based display systems provide holographic virtual images displayed by the display device that are focused at infinity.

In some embodiments, the input coupler and output coupler may be configured as diffractive optical elements (DOEs). DOEs may comprise, for example, surface relief grating (SRG) structures and volumetric holographic grating (VHG) structures. An intermediate DOE (not shown) may also be disposed in the light path between the input coupler and output coupler in some cases. The intermediate DOE may be configured to provide exit pupil expansion in one direction (e.g., horizontal) while the output coupler may be configured to provide exit pupil expansion in a second direction (e.g., vertical).

In alternative embodiments, the optical combiner functionality provided by the waveguide and diffractive DOEs may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element. In other embodiments, the principles of the present eye tracker illumination may be implemented using a reflective waveguide combiner with any suitable in-coupling and/or out-coupling methods. A reflective waveguide combiner may utilize a single waveguide in some implementations for all colors in the virtual images which may be desirable in some applications. By comparison, diffractive combiners typically require multiple waveguides to meet a target FOV in polychromatic applications due to limitations on angular range that is dictated by the waveguide TIR condition.

The present eye tracker illumination may also be utilized with various other waveguide/coupling configurations beyond reflective and diffractive. For example, it may be appreciated that the principles of the present invention may be alternatively applied to waveguides that are refractive, polarized, hybrid diffractive/refractive, phase multiplexed holographic, and/or achromatic metasurfaces.

A negative lens 530 is located on the eye side of the waveguide 530 (the eye side is indicated by reference numeral 514 in FIG. 5). The negative lens acts over the entire extent of the eyebox associated with the user's eye 115 to thereby create the diverging rays 535 from the collimated rays 540 that exit the output coupler 525. When the imager 515 is operated to project virtual images that are in-coupled into the waveguide 505, the output diverging rays present the virtual images at a predetermined focal depth, d, from the display device at a point of focus, F. For example, if the negative lens is configured with −0.5 diopters of optical power, then d is equal to 2 m. To ensure that the user's view of the real world remains unperturbed by the negative lens, a conjugate positive (i.e., convex) lens 605 is located on the real-world side of the waveguide to compensate for the impact of the negative lens on the real-world side, as shown in FIG. 6. The conjugate pair of positive and negatives lenses may be referred to as a push-pull lens pair in some contexts. In some applications, the functionality of the negative lens may be provided by a discrete standalone optical element. In other applications, one or more of the elements in the display device may be configured to incorporate the negative lens as an additional functionality. For example, the negative lens functionality can be integrated into the output coupler and/or waveguide in the display device using any suitable technique.

Different amounts of optical power may be utilized to provide for focal planes that are located at other distances to suit requirements of a particular application. The power of the negative lens 530 does not affect the zeroth diffraction order that travels in TIR down the waveguide 505 (i.e., from top to bottom in the drawings), but instead only the diffracted out-coupled field. In addition, the see-through field is not affected by the negative lens because whatever portion of the see-through field that is diffracted by the output coupler 525 is trapped by TIR in the waveguide and is therefore not transmitted to the user's eye 115.

As shown in FIG. 6, a function generator 610 is operatively coupled to the imager 515 to enable it to selectively light pixels in the display device 105 to provide illumination as virtual glint sources. In some implementations the function generator may be a standalone component while in other implementation its functionalities may be fully or partially incorporated into the imager itself. The function generator provides pixel lighting instructions to the imager to thereby control its function and operation at predetermined times. For example, the function generator may instruct the imager to provide eye tracker illumination as needed to enable robust eye tracking in a way that minimizes impact on the rendering of virtual images on the display device.

Imager operations for virtual image projection and eye tracker illumination may thus be performed synchronously by executing non-currently in which one operation finishes before the other can start. The imager 515 typically renders virtual images at some nominal frame or refresh rate that is sufficiently high to provide a stable and immersive user experience with the HMD device 100. Thus, the function generator 610 may instruct the imager 515 to provide eye tracker illumination for a single rendered frame on the display device 105, across multiple frames, or using a combination of non-sequential frames. The particular manner with which the eye tracker illumination operation steals frames from the virtual imaging operation may vary by application.

The function generator 610 may be configured to cause the imager 515 to light a single pixel within the FOV of the display device 105, a group of adjacent pixels, or multiple non-adjacent pixels. The lit pixels provide virtual glint sources that are located at the point of focus F at the focal depth d. The imager may be further configured to light pixels in a single color component of a suitable color model. For example, if the imager is arranged to use an RGB color model, then the function generator can cause the imager to light pixels in a single or combination of RGB colors. All the RGB colors can also be utilized to produce white light for glint sources or general illumination.

It may be appreciated that the function generator 610 can thus drive the imager 515 to provide dynamically adaptable illumination for virtual glint sources and other purposes. Spatial, color, and temporal characteristics of the illumination can be varied to meet the needs of a particular application, for example on a per-device or per-user basis. Advantageously, the virtual sources are located in the FOV of the HMD user at the same focal plane as virtual images without blocking the user's view of the real-world through the display device 105.

Figure 7:
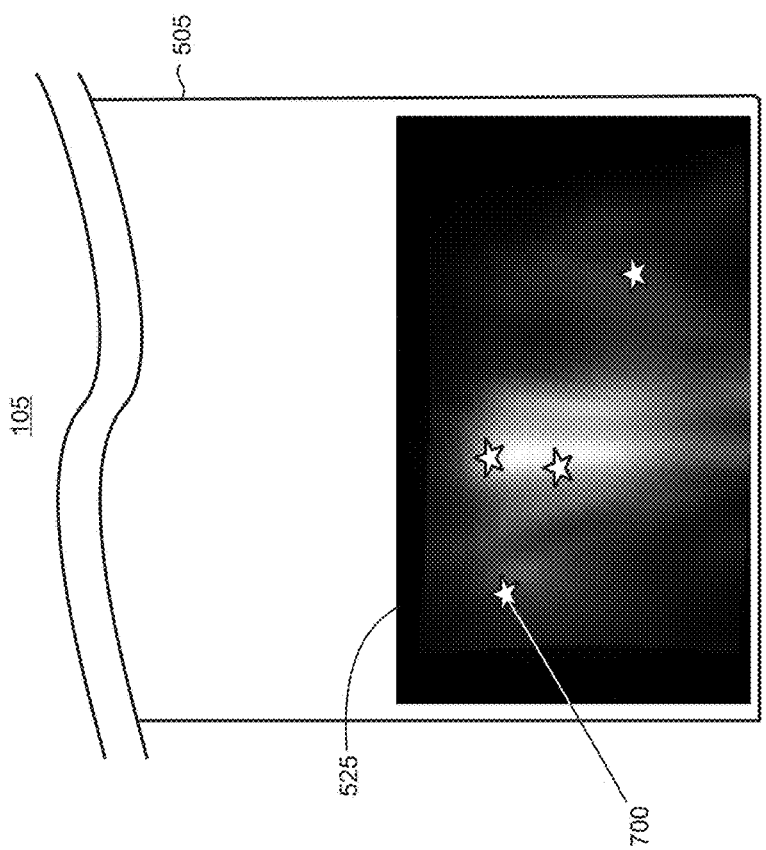
FIG. 7 provides a partial front view of an illustrative optical combiner in which virtual glint sources are located at local points of peak intensity.

Waveguide-based display devices generally have some inherent non-uniformities with respect to, for example, perceived color, contrast, resolution, and intensity across the FOV due to a variety of limitations in terms of physics and typical design tradeoffs. As shown in FIG. 7, some angles within the FOV of a given display device 105 (which includes the waveguide 505 and output coupler 525) can be expected to have higher relative efficiency compared to other angles. This can result, for example, in particular locations in the display device having higher intensity relative to the others. Corrections are typically made for the non-uniformities by digital adjustment to the virtual image rendering parameters at the imager. For illumination purposes, pixels lit by the imager 515 (FIGS. 5 and 6) at the peak angles of efficiency in FOV may provide more optimized glint sources (as representatively indicated by reference numeral 700) in some instances which may enable shorter eye tracker algorithmic integration intervals or more accurate tracking, for example.

The present eye tracker illumination through a waveguide may interoperate with various functional elements of an eye tracking system that includes an eye tracker 615, as shown in FIG. 6, which executes eye tracking algorithms using the glints produced by the virtual sources. The interoperation may comprise coordination between operations of imager and eye tracker when respectively projecting pixels in the FOV as virtual glint sources and analyzing the glints to perform eye tracking, as discussed above.

Figure 8:
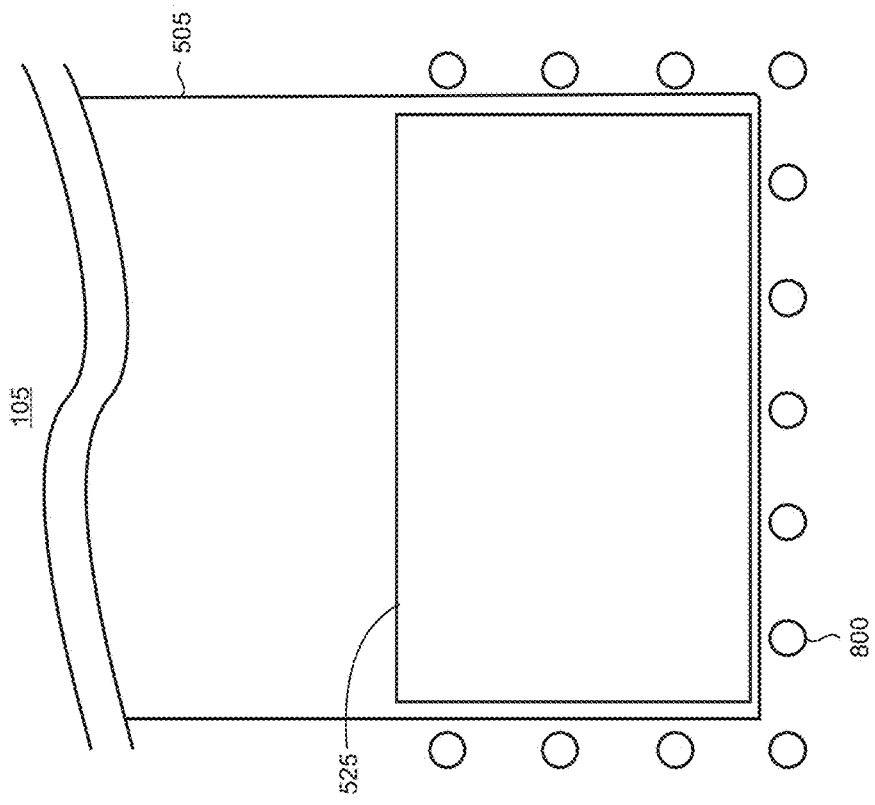
FIG. 8 provides a partial front view of an illustrative optical combiner in which eye tracker sensors are located around a periphery of a display region.

The eye tracking system may also include one or more sensors (as representatively indicated by reference numeral 800) or cameras that are typically located in various positions around the periphery of the output coupler 525, for example, as shown in FIG. 8. When the virtual glint sources comprise pixels in the RGB color model, the sensors are configured for corresponding sensitivity to suitable visible light wavelengths. In alternative embodiments shown in FIG. 9 and described in the accompanying text below, sensors may be configured to receive glints reflected from features of the user's eyes in IR wavelengths.

Figure 9:
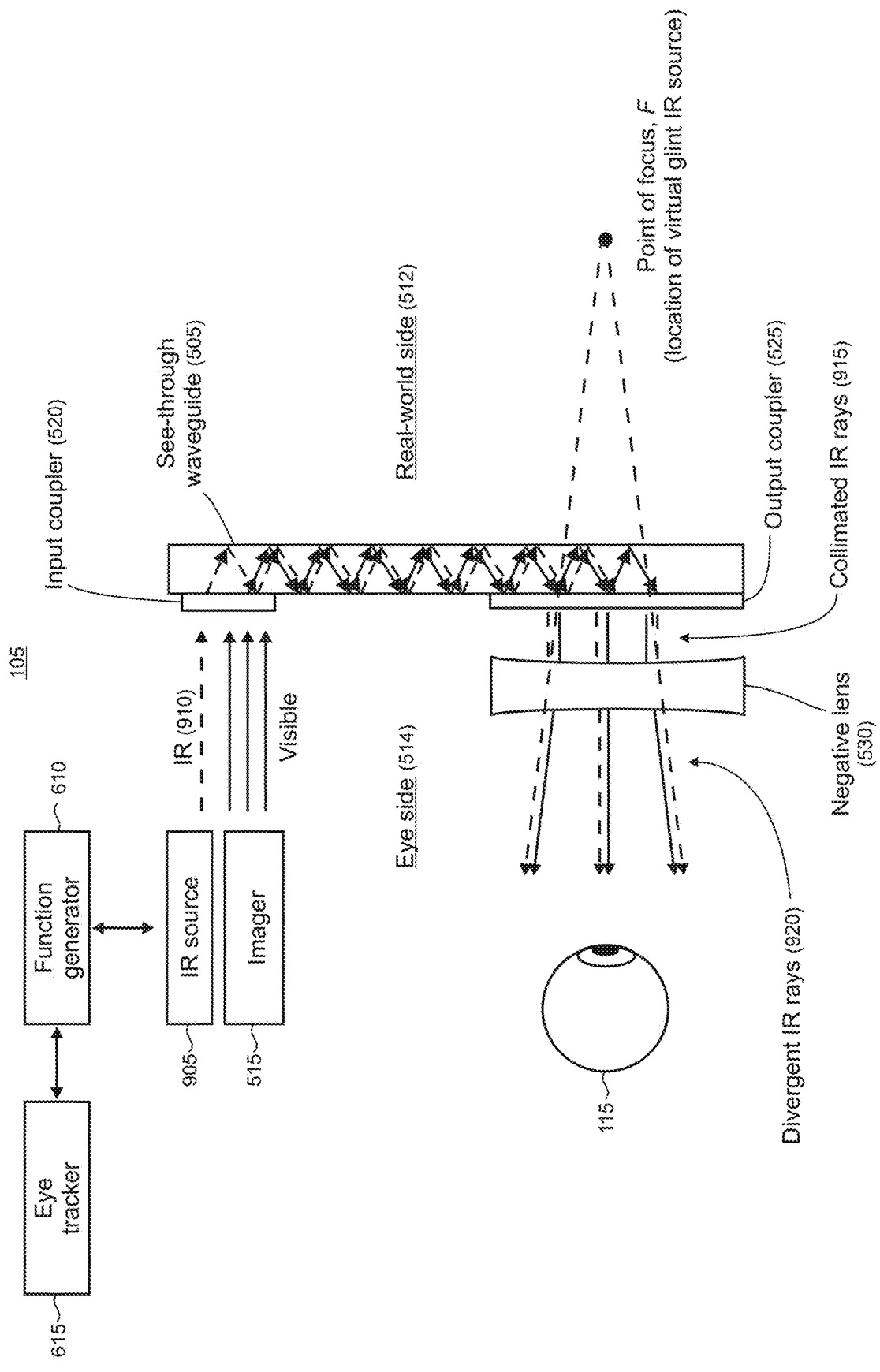
FIG. 9 shows in illustrative display device that includes an infrared (IR) light source.

FIG. 9 shows an illustrative alternative implementation of eye tracker illumination through a waveguide using an IR source 905. In some implementations using multiple waveguides, the IR light path may be embodied in its own discrete waveguide. Alternatively, for RGB implementations, the IR light path may utilize the waveguide for the red color component which may provide satisfactory performance over a usable range of angles. In implementations using a single reflective waveguide, a reflective structure that is sensitive to IR wavelengths may be utilized for in-coupling and/or out-coupling functionalities.

The IR source 905 may comprise, for example, a laser or an LED and be operatively coupled to the function generator 610. The function generator can operate in a coordinated manner with the eye tracker to drive the IR source to provide IR illumination for one or more pixels as virtual glint sources for the eye tracker 615. As shown in FIG. 9, one or more beams 910 of IR light are in-coupled by the input coupler 520 to the waveguide 505 and propagate downward in TIR. The output coupler 525 outputs collimated IR rays 915 which the negative lens 530 guides into divergent rays 920 to thereby locate a virtual IR glint source in front of the user's eye at the point of focus, F.

Figure 10:
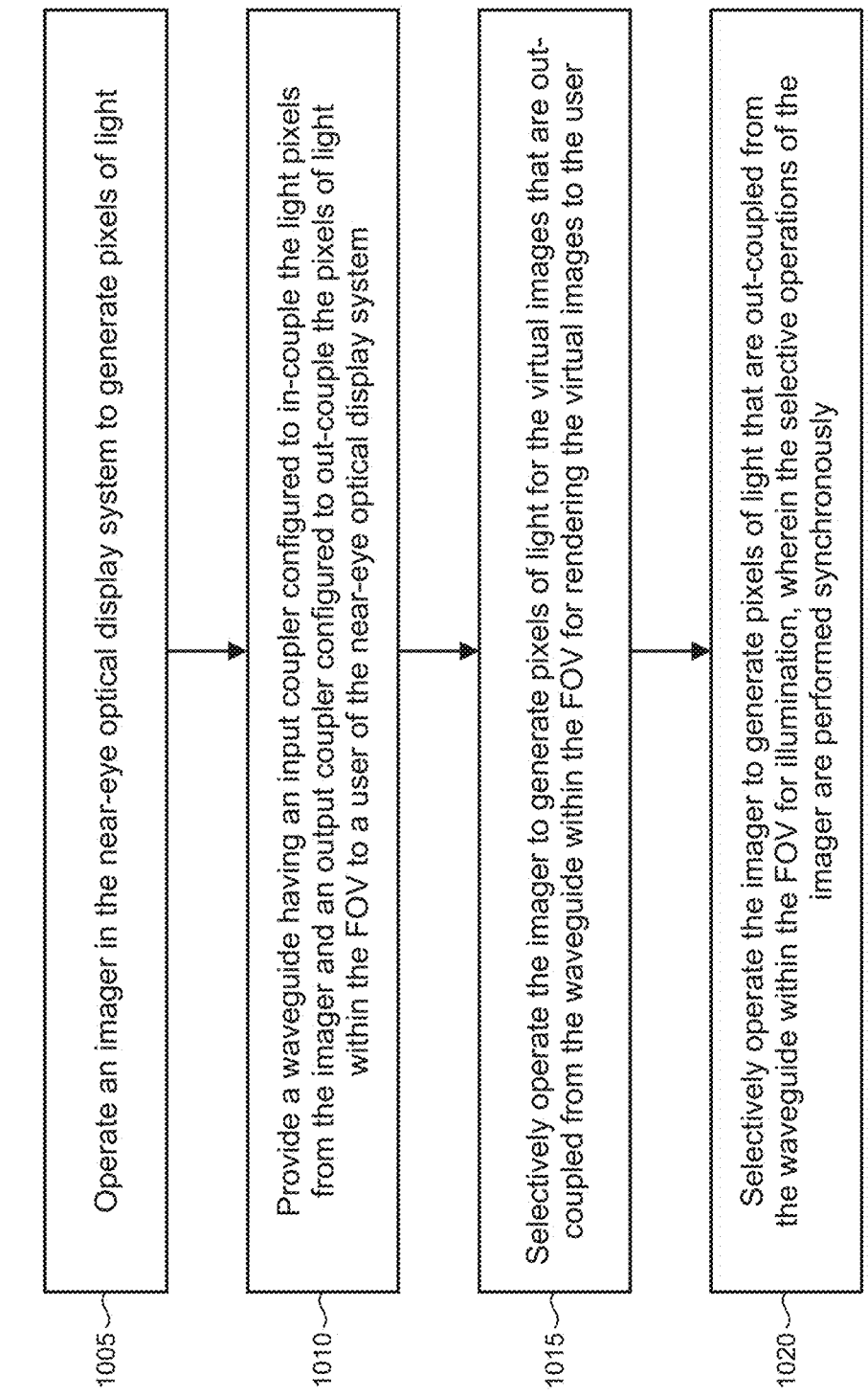
FIG. 10 is a flowchart of an illustrative method for operating a near-eye optical display system to display virtual images within a FOV.

FIG. 10 is a flowchart 1000 of an illustrative method for operating a near-eye optical display system to display virtual images within an FOV. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1005, an imager is operated in the near-eye optical display system to generate pixels of light. In step 1010, a waveguide is provided which has an input coupler configured to in-couple the light pixels from the imager and an output coupler configured to out-couple the pixels of light within the FOV to a user of the near-eye optical display system.

In step 1015, the imager is selectively operated to generate pixels of light for the virtual images that are out-coupled from the waveguide within the FOV for rendering the virtual images to the user. In step 1020, the imager is selectively operated to generate pixels of light that are out-coupled from the waveguide within the FOV for illumination, in which the selective operations of the imager are performed synchronously. The pixels may be used, for example, to illuminate particular features of the user's eye such as the iris for biometric identification and/or authentication. For example, the near-eye optical display system may be incorporated into an HMD device (e.g., a virtual- or mixed-reality HMD device) and iris scanning can be used to identify a particular user who dons the HMD device. Appropriate user preferences, settings, and the like can then be automatically loaded into the device, for example. In authentication scenarios, the HMD device can be fully or partially disabled when a user is determined to be a non-authorized user of the device based on a result of iris scanning.

Figure 11:
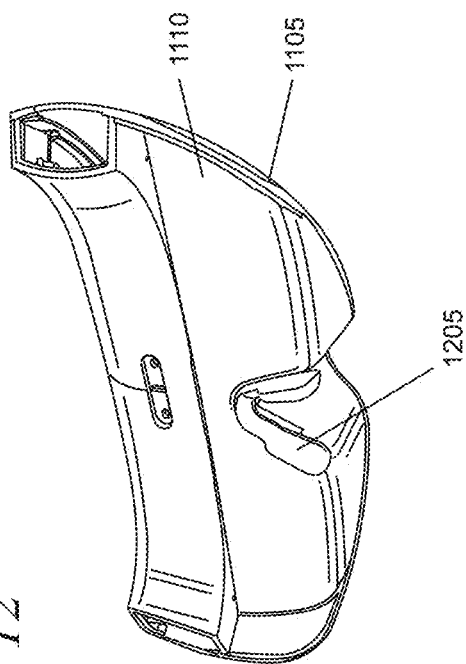
FIG. 11 shows a pictorial front view of an illustrative sealed visor that may be used as a component of an HMD device.
Figure 12:
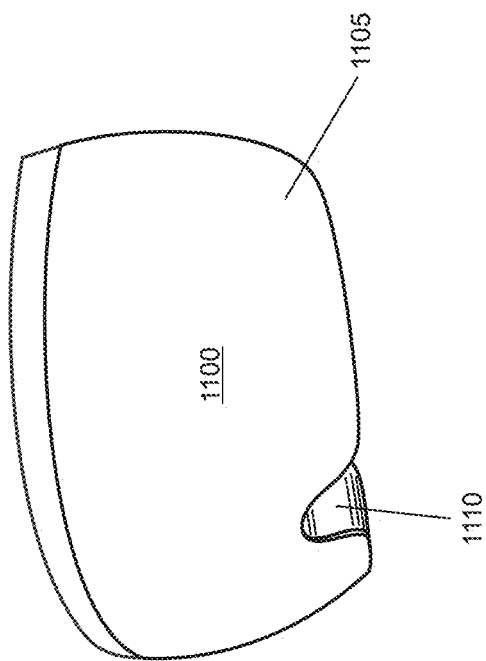
FIG. 12 shows a pictorial rear view of an illustrative sealed visor.

FIGS. 11 and 12 show respective front and rear views of an illustrative example of a visor 1100 that incorporates an internal near-eye display device 105 (FIGS. 1 and 5) that is used in the HMD device 100 as worn by a user 115. The visor, in some implementations, may be sealed to protect the internal display device. The visor typically interfaces with other components of the HMD device such as head-mounting/retention systems and other subsystems including sensors, power management, controllers, etc., as illustratively described in conjunction with FIGS. 16 and 17. Suitable interface elements (not shown) including snaps, bosses, screws and other fasteners, etc. may also be incorporated into the visor.

Figure 13:
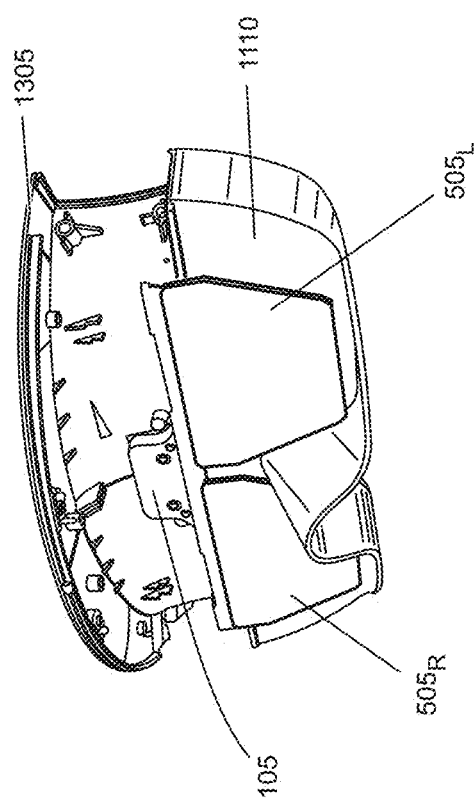
FIG. 13 shows a partially disassembled view of an illustrative sealed visor.

The visor 1100 may include see-through front and rear shields, 1105 and 1110 respectively, that can be molded using transparent or partially transparent materials to facilitate unobstructed vision to the display device and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 1305 shown in the disassembled view in FIG. 13.

The sealed visor 1100 can physically protect sensitive internal components, including a display device 105, when the HMD device is operated and during normal handling for cleaning and the like. The display device in this illustrative example includes left and right waveguides $505_L$ and $505_R$ that respectively provide holographic virtual images to the user's left and right eyes for mixed- and/or virtual-reality applications. The visor can also protect the display device from environmental elements and damage should the HMD device be dropped or bumped, impacted, etc.

As shown in FIG. 12, the rear shield 1110 is configured in an ergonomically suitable form 1205 to interface with the user's nose, and nose pads and/or other comfort features can be included (e.g., molded-in and/or added-on as discrete components). In some applications, the sealed visor 1110 can also incorporate some level of optical diopter curvature (i.e., eye prescription) within the molded shields in some cases. The sealed visor 1100 can also be configured to incorporate the conjugate lens pair—the negative lens 530 and positive lens 605 (FIG. 6) on either side of display device 105.

Figure 14:
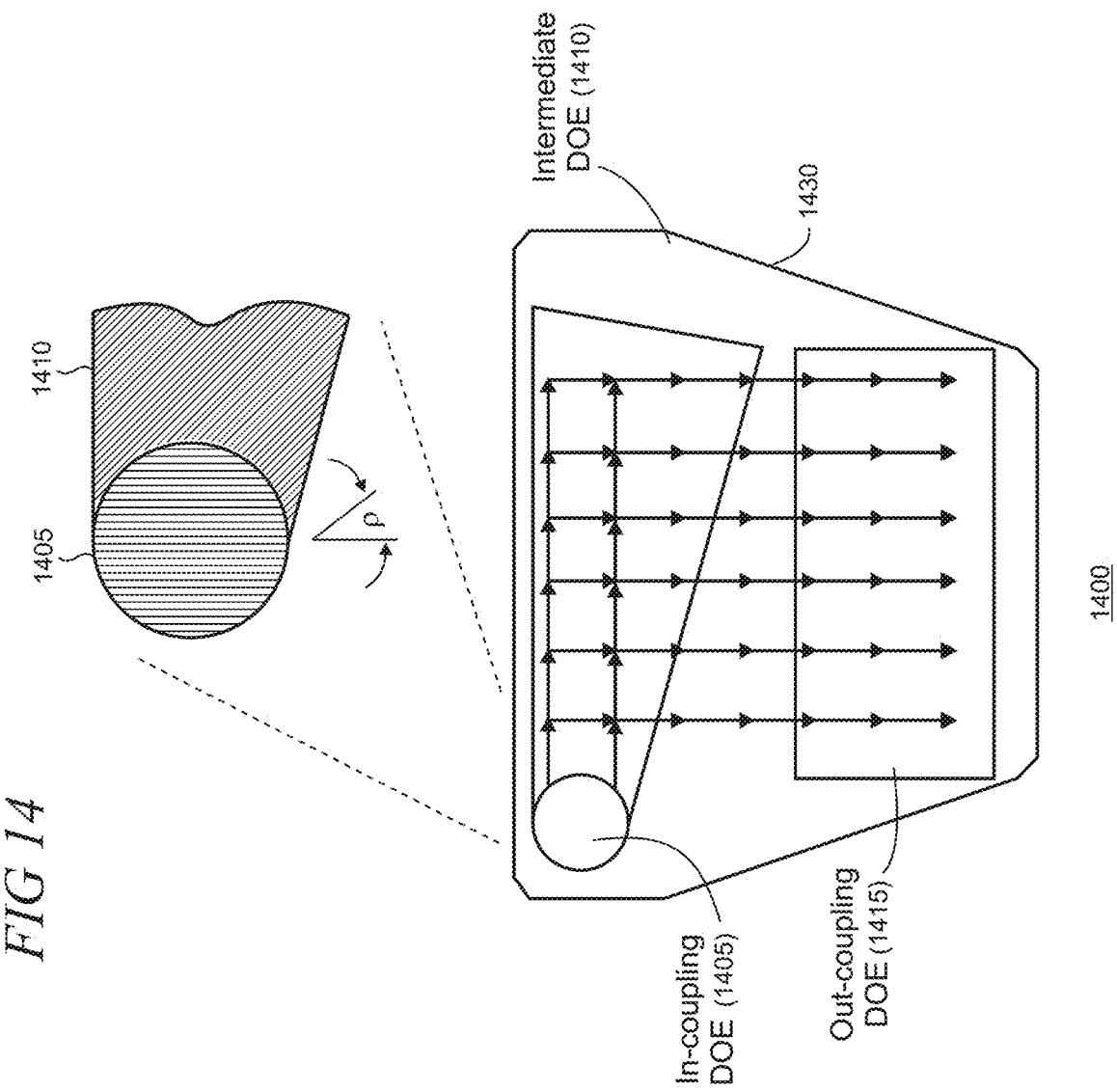
FIG. 14 shows an illustrative arrangement of diffractive optical elements (DOEs) configured for in-coupling, exit pupil expansion in two directions, and out-coupling.

FIG. 14 shows an illustrative waveguide display 1400 having multiple DOEs that may be used as an embodiment of the see-through waveguide 505 in the display device 105 (FIG. 5) to provide in-coupling, expansion of the exit pupil in two directions, and out-coupling. The waveguide display 1400 may be utilized to provide holographic virtual images from a virtual imager to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide display 1400 includes an in-coupling DOE 1405, an out-coupling DOE 1415, and an intermediate DOE 1410 that couples light between the in-coupling and out-coupling DOEs. The in-coupling DOE is configured to couple image light comprising one or more imaging beams from an imager 515 (FIG. 5) into a waveguide 1430. The intermediate DOE expands the exit pupil in a first direction along a first coordinate axis (e.g., horizontal), and the out-coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the in-coupling DOE and the intermediate DOE as shown. As the light propagates in the intermediate DOE (horizontally from left to right in the drawing), it is also diffracted (in the downward direction) to the out-coupling DOE.

While DOEs are shown in this illustrative example using a single in-coupling DOE disposed to the left of the intermediate DOE 1410, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation.

As noted above, in implementations using a color model such as RGB, multiple waveguides may be utilized in the display device 105 (FIGS. 1 and 5). FIG. 15 shows illustrative propagation of light from the imager 515 through an optical combiner 1500 that uses a separate waveguide for each color component in the RGB color model. The light from the imager 515 may be utilized for virtual image projection and eye tracker illumination in accordance with the present principles of the invention. In alternative implementations, two waveguides may be utilized in which one waveguide can support two color components and the other waveguide may support a single color component.

For a given angular range within the virtual FOV, light for each color component 1505, 1510, and 1515 provided by the imager 515 is in-coupled into respective waveguides 1530, 1535, and 1540 using respective individual input couplers (representatively indicated by element 1520). The light for each color propagates through the respective waveguides in TIR and is out-coupled by respective output couplers (representatively indicated by element 1525) to the user's eye 115. In some implementations the output may have an expanded pupil relative to the input in the horizontal and vertical directions, for example when using DOEs that provide for pupil expansion, as discussed above.

The input coupler 1520 for each waveguide 1530, 1535, and 1540 is configured to in-couple light within an angular range described by the FOV and within a particular wavelength range into the waveguide. Light outside the wavelength range passes through the waveguide. For example, the blue light 1505 is outside the range of wavelength sensitivity for both of the input couplers in the red waveguide 1540 and green waveguide 1535. The blue light therefore passes through the red and green waveguides to reach the in-coupling DOE in the blue waveguide 1530 where it is in-coupled, propagated in TIR within the waveguide, propagated to the output coupler and out-coupled to the user's eye 115.

Figure 16:
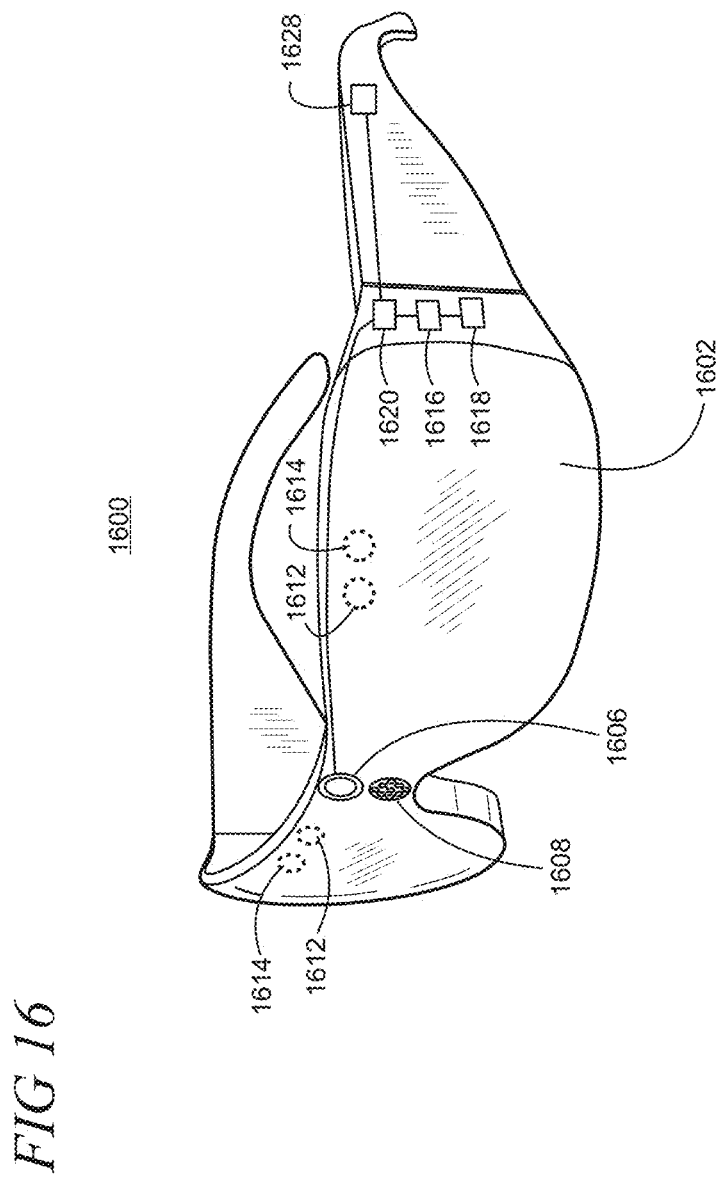
FIG. 16 is a pictorial view of an illustrative example of a virtual-reality or mixed-reality HMD device that may use the present eye tracker illumination through a waveguide.
Figure 17:
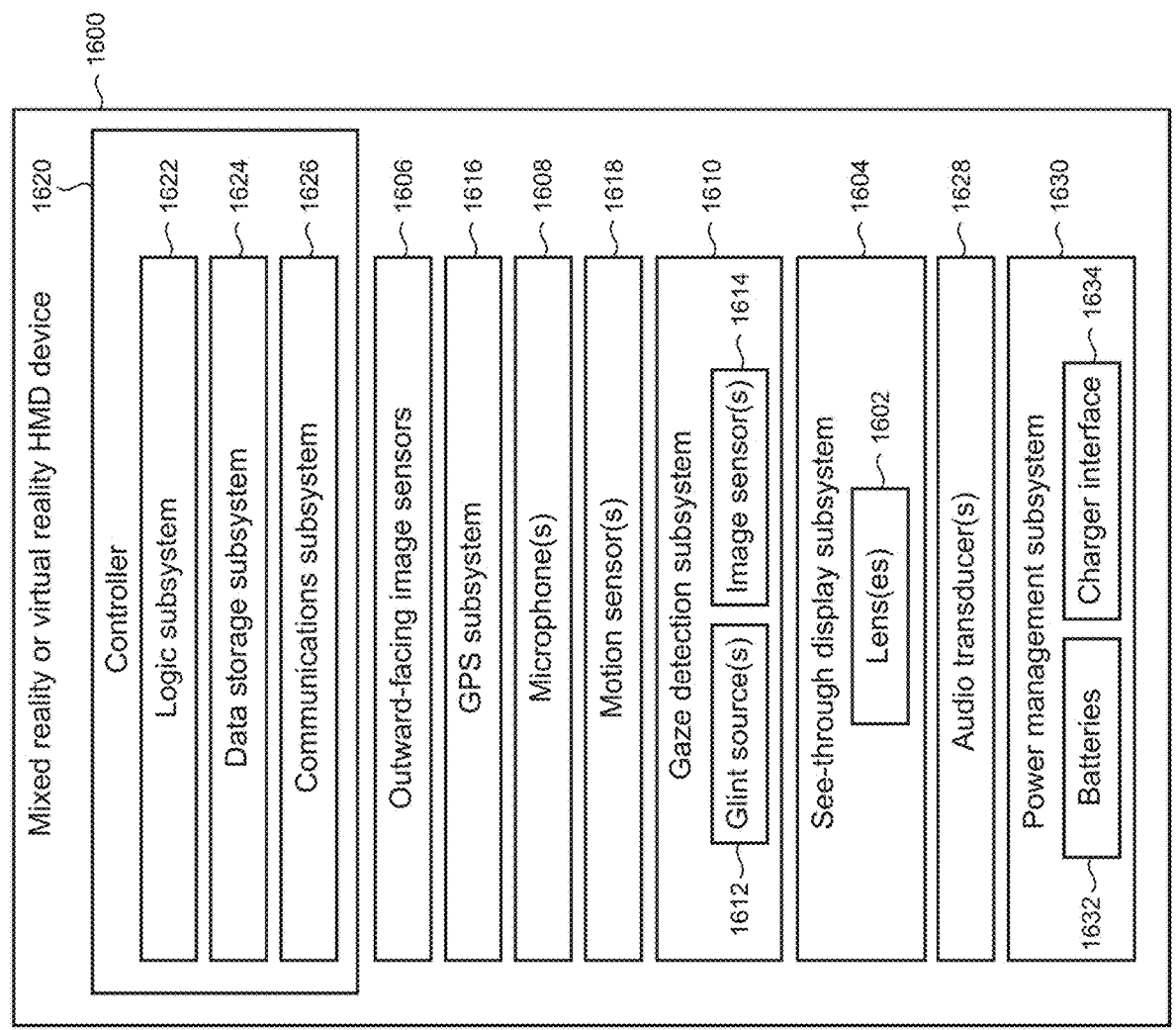
FIG. 17 shows a block diagram of an illustrative example of a virtual-reality or mixed-reality HMD device that may use the present eye tracker illumination through a waveguide.

As noted above, the present eye tracker illumination through a waveguide may be utilized in mixed- or virtual-reality applications. FIG. 16 shows one particular illustrative example of a mixed-reality HMD device 1600, and FIG. 17 shows a functional block diagram of the device 1600. The HMD device 1600 provides an alternative form factor to the HMD device 100 shown in FIGS. 1, 2, 11, 12, and 13. HMD device 1600 comprises one or more lenses 1602 that form a part of a see-through display subsystem 1604, so that images may be displayed using lenses 1602 (e.g., using projection onto lenses 1602, one or more waveguide systems, such as a near-eye display system, incorporated into the lenses 1602, and/or in any other suitable manner).

HMD device 1600 further comprises one or more outward-facing image sensors 1606 configured to acquire images of a background scene and/or physical environment being viewed by a user and may include one or more microphones 1608 configured to detect sounds, such as voice commands from a user. Outward-facing image sensors 1606 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 1600 may further include a gaze detection subsystem 1610 configured for detecting a direction of gaze of each eye of a user or a direction or location of focus, as described above. Gaze detection subsystem 1610 may be configured to determine gaze directions of each of a user's eyes in any suitable manner. For example, in the illustrative example shown, a gaze detection subsystem 1610 includes one or more glint sources 1612, such as virtual IR light or visible sources as described above, that are configured to cause a glint of light to reflect from each eyeball of a user, and one or more image sensors 1614, such as inward-facing sensors, that are configured to capture an image of each eyeball of the user. Changes in the glints from the user's eyeballs and/or a location of a user's pupil, as determined from image data gathered using the image sensor(s) 1614, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 1610 may have any suitable number and arrangement of light sources and image sensors. In some implementations, the gaze detection subsystem 1610 may be omitted.

The HMD device 1600 may also include additional sensors. For example, HMD device 1600 may comprise a global positioning system (GPS) subsystem 1616 to allow a location of the HMD device 1600 to be determined. This may help to identify real-world objects, such as buildings, etc., that may be located in the user's adjoining physical environment.

The HMD device 1600 may further include one or more motion sensors 1618 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 1606. The use of motion data may allow changes in gaze direction to be tracked even if image data from outward-facing image sensor(s) 1606 cannot be resolved.

In addition, motion sensors 1618, as well as microphone(s) 1608 and gaze detection subsystem 1610, also may be employed as user input devices, such that a user may interact with the HMD device 1600 via gestures of the eye, neck and/or head, as well as via verbal commands in some cases. It may be understood that sensors illustrated in FIGS. 16 and 17 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 1600 can further include a controller 1620 such as one or more processors having a logic subsystem 1622 and a data storage subsystem 1624 in communication with the sensors, gaze detection subsystem 1610, display subsystem 1604, and/or other components through a communications subsystem 1626. The communications subsystem 1626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1624 may include instructions stored thereon that are executable by logic subsystem 1622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 1600 is configured with one or more audio transducers 1628 (e.g., speakers, earphones, etc.) so that audio can be utilized as part of a mixed-reality or virtual-reality experience. A power management subsystem 1630 may include one or more batteries 1632 and/or protection circuit modules (PCMs) and an associated charger interface 1634 and/or remote power interface for supplying power to components in the HMD device 1600.

It may be appreciated that the HMD device 1600 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 18:
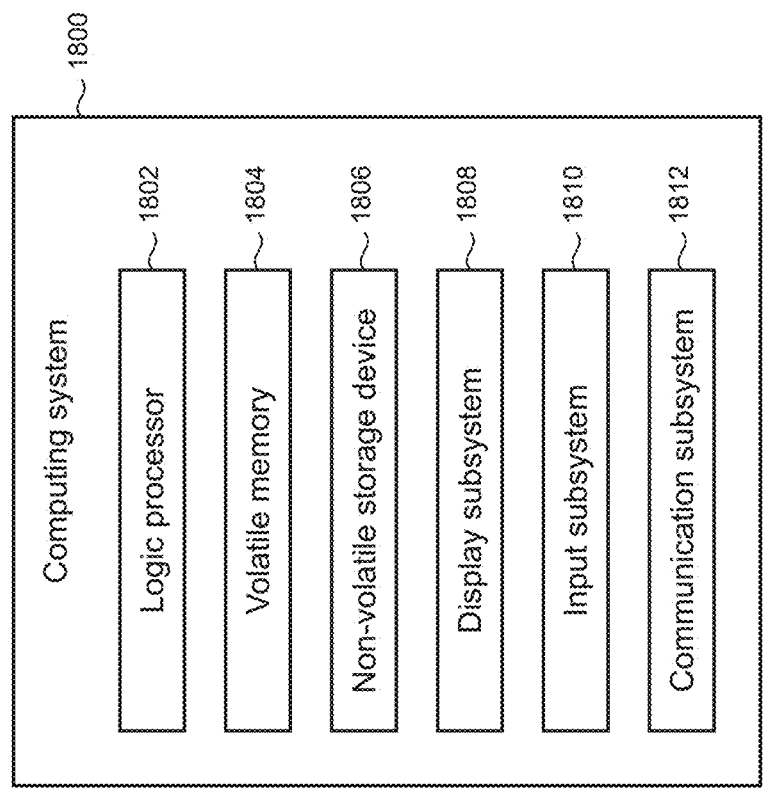
FIG. 18 schematically shows an illustrative example of a computing system that can enact one or more of the methods and processes described above for the present eye tracker illumination through a waveguide.

FIG. 18 schematically shows an illustrative example of a computing system that can enact one or more of the methods and processes described above for the present eye tracker illumination through a waveguide. Computing system 1800 is shown in simplified form. Computing system 1800 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 1800 includes a logic processor 1802, volatile memory 1804, and a non-volatile storage device 1806. Computing system 1800 may optionally include a display subsystem 1818, input subsystem 1810, communication subsystem 1812, and/or other components not shown in FIG. 18.

Logic processor 1802 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 1806 includes one or more physical devices configured to hold instructions executable by the logic processors to implement the methods and processes described herein. When such methods and processes are implemented, the state of non-volatile storage device 1806 may be transformed—e.g., to hold different data.

Non-volatile storage device 1806 may include physical devices that are removable and/or built-in. Non-volatile storage device 1806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1806 may include nonvolatile, dynamic, static, read/write, read-only, sequential-access, location-addressable, file-addressable, and/or content-addressable devices. It will be appreciated that non-volatile storage device 1806 is configured to hold instructions even when power is cut to the non-volatile storage device 1806.

Volatile memory 1804 may include physical devices that include random access memory. Volatile memory 1804 is typically utilized by logic processor 1802 to temporarily store information during processing of software instructions. It will be appreciated that volatile memory 1804 typically does not continue to store instructions when power is cut to the volatile memory 1804.

Aspects of logic processor 1802, volatile memory 1804, and non-volatile storage device 1806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1800 typically implemented in software by a processor to perform a particular function using portions of volatile memory, which function involves transformative processing that specially configures the processor to perform the function. Thus, a program may be instantiated via logic processor 1802 executing instructions held by non-volatile storage device 1806, using portions of volatile memory 1804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 1808 may be used to present a visual representation of data held by non-volatile storage device 1806. This visual representation may take the form of a graphical user interface (GUI). As the herein described methods and processes change the data held by the non-volatile storage device, and thus transform the state of the non-volatile storage device, the state of display subsystem 1808 may likewise be transformed to visually represent changes in the underlying data. Display subsystem 1808 may include one or more display devices utilizing virtually any type of technology; however, one utilizing a MEMS projector to direct laser light may be compatible with the eye-tracking system in a compact manner. Such display devices may be combined with logic processor 1802, volatile memory 1804, and/or non-volatile storage device 1806 in a shared enclosure, or such display devices may be peripheral display devices.

When included, input subsystem 1810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1812 may be configured to communicatively couple various computing devices described herein with each other, and with other devices. Communication subsystem 1812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1800 to send and/or receive messages to and/or from other devices via a network such as the Internet.

Various exemplary embodiments of the present eye tracker illumination through a waveguide are now presented by way of illustration and not as an exhaustive list of all embodiments. An example includes an illumination system disposed in a near-eye mixed-reality display system adapted for providing illumination for an eye tracker, comprising: at least one see-through optical waveguide through which real-world images are viewable by a user of the mixed-reality display system; an imager generating optical beams for virtual images for each individual color component in a color model utilized in the display system; an input coupler disposed on the see-through optical waveguide configured to in-couple one or more optical beams for the virtual images into the see-through optical waveguide; an output coupler disposed on the see-through optical waveguide configured to out-couple the one or more optical beams for the virtual images from the see-through optical waveguide to an eye of a user of the near-eye mixed-reality display system, in which virtual images associated with the out-coupled beams are rendered within a field of view (FOV) of the display system; and a function generator operatively coupled to the imager and configured to cause the imager to light one or more pixels in one or more of the color components at locations within the FOV to provide illumination of features of the user's eye, wherein the eye tracker is configured to track one or more of motion, orientation, or gaze direction of the user's eye based on the illuminated features.

In another example, the function generator is configured to cause the imager to light one or more pixels that are located in one or more areas of peak intensity within the FOV. In another example, the function generator is configured to cause the imager to light, on the display system, one of a single pixel, a group of adjacent pixels, or a plurality of non-adjacent pixels. In another example, the function generator is configured to cause the imager to light, on the display system, pixels of a single color component of the color model. In another example, the function generator is configured to cause the imager to light, on the display system, pixels for all components of the color model. In another example, the imager renders virtual images on the display system at a frame rate, and in which the function generator is configured to cause the imager to light pixels in one of a single frame, group of successive frames, or a plurality of non-successive frames. In another example, the function generator is operatively coupled to the eye tracker to coordinate illumination of the eye features with capturing of glints from the eye features by the eye tracker.

A further example includes a head-mounted display (HMD) device wearable by a user and supporting a mixed-reality experience including viewing virtual images from a virtual world that are combined with real-world images of objects in a physical world, comprising: a see-through waveguide-based display system through which the user can view the physical world and on which the virtual images are rendered within a field of view (FOV) of the display system; an imager generating one or more optical beams for the virtual images that are rendered by the see-through waveguide-based display system, the imager further configured to light one or more individual pixels within the FOV to provide glint sources; and one or more sensors configured to capture glints reflected from features of an eye of the user for eye tracking.

In another example, the virtual images are rendered according to an RGB (red, green, blue) color model and the see-through waveguide-based display system comprises one or more waveguides through which optical beams corresponding to different components of the color model propagate. In another example, the one or more waveguides each include diffractive optical elements respectively configured as an input coupler and an output coupler, the input coupler configured to in-couple one or more optical beams for the virtual images into a respective one or more waveguides, and the output coupler configured to out-couple one or more optical beams for the virtual images from a respective one or more waveguides to an eye of the user, in which virtual images associated with the out-coupled beams are rendered within the FOV. In another example, the see-through waveguide-based display system comprises one or more waveguides that include an input coupler and an output coupler implemented using wavelength-sensitive reflective coatings, in which the input coupler is configured to in-couple one or more optical beams for the virtual images into the one or more waveguides and the output coupler is configured to out-couple the one or more optical beams for the virtual images from the one or more waveguides to an eye of the user, in which virtual images associated with the out-coupled beams are rendered within the FOV. In another example, the HMD device further comprises a positive lens and a negative lens that are operable as a conjugate pair, the positive lens disposed on a real-world side of the see-through waveguide-based display system and the negative lens disposed on an eye side of the see-through waveguide-based display system, wherein the negative lens is configured to impart virtual focus to the virtual images at a non-infinite distance from the HMD device. In another example, the negative lens is incorporated into an output coupler disposed on a waveguide in the see-through waveguide-based display system. In another example, the negative lens further imparts virtual focus to the glint sources within the FOV at the non-infinite distance from the HMD device. In another example, the HMD device further comprises an IR (infrared) light source that is coupled to and propagating through the see-through waveguide-based display system in an IR light path to provide one or more IR pixels in the FOV, the IR pixels being lit to provide IR glint sources for the eye tracking. In another example, the virtual images are rendered according to an RGB (red, green, blue) color model and the see-through waveguide-based display system comprises a waveguide configured to propagate a red light component of the color model and the IR light. In another example, the imager dynamically lights pixels as glint sources using a variably configurable pattern of pixels or groups of pixels.

A further example includes a method for operating a near-eye optical display system to display virtual images within a field of view (FOV), comprising: operating an imager in the near-eye optical display system to generate pixels of light; providing a waveguide having an input coupler configured to in-couple the light pixels from the imager and an output coupler configured to out-couple the pixels of light within the FOV to a user of the near-eye optical display system; selectively operating the imager to generate pixels of light for the virtual images that are out-coupled from the waveguide within the FOV for rendering the virtual images to the user; and selectively operating the imager to generate pixels of light that are out-coupled from the waveguide within the FOV for illumination, wherein the selective operations of the imager are performed synchronously.

In another example, the pixels of lights illuminate features of the user's eye for iris recognition associated with biometric identification or authentication. In another example, the near-eye optical display system is included in one of a mixed-reality device or a virtual-reality device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. An illumination system disposed in a near-eye mixed-reality display system adapted for providing illumination for an eye tracker, comprising:

at least one see-through optical waveguide through which real-world images are viewable by a user of the near-eye mixed-reality display system;

an imager generating optical beams for virtual images for each individual color component in a color model utilized in the near-eye mixed reality display system;

an input coupler disposed on the see-through optical waveguide configured to in-couple one or more optical beams for the virtual images into the see-through optical waveguide;

an output coupler disposed on the see-through optical waveguide configured to out-couple the one or more optical beams for the virtual images from the see-through optical waveguide to an eye of a user of the near-eye mixed-reality display system, in which virtual images associated with the out-coupled beams are rendered within a field of view (FOV) of the near-eye mixed reality display system;

a function generator operatively coupled to the imager and configured to cause the imager to light one or more pixels in one or more of the color components at locations within the FOV to provide one or more glint sources for illumination of features of the user's eye, wherein the eye tracker is configured to track one or more of motion, orientation, or gaze direction of the user's eye based on the illuminated features; and a negative lens disposed on an eye side of the at least one see-through optical waveguide, wherein the negative lens imparts a virtual point of focus to the one or more glint sources at a fixed focal depth that is a non-infinite distance away from the near-eye mixed-reality display system.

2. The illumination system of claim 1 in which the function generator is configured to cause the imager to light one or more pixels that are located in one or more areas of peak intensity within the FOV.

3. The illumination system of claim 1 in which the function generator is configured to cause the imager to light, on the display system, one of a single pixel, a group of adjacent pixels, or a plurality of non-adjacent pixels.

4. The illumination system of claim 3 in which the function generator is configured to cause the imager to light, on the display system, pixels of a single color component of the color model.

5. The illumination system of claim 3 in which the function generator is configured to cause the imager to light, on the display system, pixels for all components of the color model.

6. The illumination system of claim 1 in which the imager renders virtual images on the display system at a frame rate, and in which the function generator is configured to cause the imager to light pixels in one of a single frame, group of successive frames, or a plurality of non-successive frames.

7. The illumination system of claim 1 in which the function generator is operatively coupled to the eye tracker to coordinate illumination of the eye features with capturing of glints from the eye features by the eye tracker.

8. A head-mounted display (HMD) device wearable by a user and supporting a mixed-reality experience including viewing virtual images from a virtual world that are combined with real-world images of objects in a physical world, comprising:

a see-through waveguide-based display system through which the user can view the physical world and on which the virtual images are rendered within a field of view (FOV) of the display system;

an imager generating one or more optical beams for the virtual images that are rendered by the see-through waveguide-based display system, the imager further configured to light one or more individual pixels within the FOV to provide glint sources;

one or more sensors configured to capture glints reflected from features of an eye of the user for eye tracking; and a negative lens disposed on an eye side of the see-through waveguide-based display system, wherein the negative lens is configured to impart a virtual point of focus to the glint sources at a fixed focal depth that is a non-infinite distance away from the see-through waveguide-based display system.

9. The HMD device of claim 8 in which the virtual images are rendered according to an RGB (red, green, blue) color model and the see-through waveguide-based display system comprises one or more waveguides through which optical beams corresponding to different components of the color model propagate.

10. The HMD device of claim 9 in which the one or more waveguides each include diffractive optical elements respectively configured as an input coupler and an output coupler, the input coupler configured to in-couple one or more optical beams for the virtual images into a respective one or more waveguides, and the output coupler configured to out-couple one or more optical beams for the virtual images from a respective one or more waveguides to an eye of the user, in which virtual images associated with the out-coupled beams are rendered within the FOV.

11. The HMD device of claim 8 in which the see-through waveguide-based display system comprises one or more waveguides that include an input coupler and an output coupler implemented using wavelength-sensitive reflective coatings, in which the input coupler is configured to in-couple one or more optical beams for the virtual images into the one or more waveguides and the output coupler is configured to out-couple the one or more optical beams for the virtual images from the one or more waveguides to an eye of the user, in which virtual images associated with the out-coupled beams are rendered within the FOV.

12. The HMD device of claim 8 further comprising a positive lens and a negative lens that are operable as a conjugate pair, the positive lens disposed on a real-world side of the see-through waveguide-based display system and the negative lens disposed on an eye side of the see-through waveguide-based display system, wherein the negative lens is configured to impart virtual focus to the virtual images at a non-infinite distance from the HMD device.

13. The HMD device of claim 12 in which the negative lens is incorporated into an output coupler disposed on a waveguide in the see-through waveguide-based display system.

14. The HMD device of claim 12 in which the negative lens further imparts virtual focus to the glint sources within the FOV at the non-infinite distance from the HMD device.

15. The HMD device of claim 8 further comprising an IR (infrared) light source that is coupled to and propagating through the see-through waveguide-based display system in an IR light path to provide one or more IR pixels in the FOV, the IR pixels being lit to provide IR glint sources for the eye tracking.

16. The HMD device of claim 15 in which the virtual images are rendered according to an RGB (red, green, blue) color model and the see-through waveguide-based display system comprises a waveguide configured to propagate a red light component of the color model and the IR light.

17. The HMD device of claim 8 in which the imager dynamically lights pixels as glint sources using a variably configurable pattern of pixels or groups of pixels.

18. A method for operating a near-eye optical display system to display virtual images within a field of view (FOV), comprising:
   operating an imager in the near-eye optical display system to generate pixels of light;
   providing a waveguide having an input coupler configured to in-couple the light pixels from the imager and an output coupler configured to out-couple the pixels of light within the FOV to a user of the near-eye optical display system;
   selectively operating the imager to generate pixels of light for the virtual images that are out-coupled from the waveguide within the FOV for rendering the virtual images to the user;
   selectively operating the imager to generate pixels of light that are out-coupled from the waveguide within the FOV to provide glint sources for illumination of features of the user's eye, wherein the selective operations of the imager are performed synchronously; and
   providing a negative lens on an eye-side of the waveguide, wherein the negative lens imparts a virtual point of focus to the glint sources at a fixed focal depth that is a non-infinite distance away from the near-eye optical display system.

19. The method of claim 18 in which the glint sources illuminate features of the user's eye for iris recognition associated with biometric identification or authentication.

20. The method of claim 18 in which the near-eye optical display system is included in one of a mixed-reality device or a virtual-reality device.

* * * * *